US010111234B2

(12) United States Patent
Park et al.

(10) Patent No.: US 10,111,234 B2
(45) Date of Patent: Oct. 23, 2018

(54) FREQUENCY ASSIGNMENT METHOD AND TRANSMISSION APPARATUS THEREFOR

(71) Applicants: Samsung Electronics Co., Ltd., Gyeonggi-do (KR); Korea University Research and Business Foundation, Seoul (KR)

(72) Inventors: Sung-Ho Park, Seoul (KR); Young-Chai Ko, Seoul (KR); Myeong-Jin Kim, Gangwon-do (KR)

(73) Assignees: Samsung Electronics Co., Ltd (KR); Korea University Research and Business Foundation (KR)

( * ) Notice: Subject to any disclaimer, the term of this patent is extended or adjusted under 35 U.S.C. 154(b) by 224 days.

(21) Appl. No.: 14/549,133

(22) Filed: Nov. 20, 2014

(65) Prior Publication Data
US 2015/0139128 A1 May 21, 2015

(30) Foreign Application Priority Data

Nov. 20, 2013 (KR) ........................ 10-2013-0141119

(51) Int. Cl.
 *H04W 72/08* (2009.01)
 *H04W 72/04* (2009.01)
 *H04W 72/02* (2009.01)

(52) U.S. Cl.
 CPC .......... *H04W 72/082* (2013.01); *H04W 72/02* (2013.01); *H04W 72/042* (2013.01); *H04W 72/0453* (2013.01)

(58) Field of Classification Search
 CPC . H04B 7/0456; H04B 7/0619; H04W 72/042; H04W 72/0453; H04W 72/082; H04W 72/020453; H04W 72/02
 See application file for complete search history.

(56) References Cited

U.S. PATENT DOCUMENTS 8,848,822 B2 9/2014 Seo et al.
2005/0197131 A1* 9/2005 Ikegami ................ H04W 16/10
 455/450

(Continued)

FOREIGN PATENT DOCUMENTS

KR 2012-0127591 11/2012

OTHER PUBLICATIONS

Ahmed A. Naguib et al. , Achievable Degrees of Freedom of the K-user Interference Channel with Partial Cooperation, 2011 IEEE, 978-1-4673-0323-1/11, p. 1363-1367.*

*Primary Examiner* — Un C Cho
*Assistant Examiner* — Fangyan Deng
(74) *Attorney, Agent, or Firm* — The Farrell Law Firm, P.C.

(57) ABSTRACT

A frequency assignment method in a communication system is provided. The method includes transmitting, by a base station, a pilot signal to the plurality of terminals; receiving, by the base station, channel information and a Signal to Interference Ratio (SIR) from the plurality of terminals as feedback information; determining, by the base station, a number of subcarriers to be used for interference alignment and a terminal to which interference alignment is to be applied, using the feedback information; selecting, by the base station, a frequency set to be used for interference alignment among preset frequency sets for interference alignment, and generating a transmit precoding matrix using a maximum of Degrees of Freedom (DoF) that can be obtained for each frequency; and transmitting, by the base station, an index of the selected frequency set to the determined terminal using the generated transmit precoding matrix.

16 Claims, 7 Drawing Sheets

(56) References Cited

U.S. PATENT DOCUMENTS

| | | | |
|---|---|---|---|
| 2012/0275402 A1* | 11/2012 | Prasad | H04W 72/0446 370/329 |
| 2012/0329507 A1* | 12/2012 | Watanabe | H04W 24/10 455/517 |
| 2014/0105121 A1* | 4/2014 | Jose | H04L 27/2613 370/329 |

* cited by examiner

FREQUENCY ASSIGNMENT METHOD AND TRANSMISSION APPARATUS THEREFOR

PRIORITY

This application claims priority under 35 U.S.C. § 119(a) to a Korean Patent Application filed on Nov. 20, 2013 in the Korean Intellectual Property Office and assigned Serial No. 10-2013-0141119, the entire contents of which are incorporated herein by reference.

BACKGROUND

1. Field of the Invention

The present invention relates to a frequency assignment method in an interference channel and a transmission apparatus therefor, and more particularly, to an interference alignment-based frequency assignment method capable of increasing the total transfer rate of the network using multi-antenna and multi-frequency resources, and a transmission apparatus therefor.

2. Description of the Related Art

Recently, in a cellular system, due to the rapid increase in massive data traffic such as multimedia services, much attention has been paid to cell miniaturization for meeting the requirements, and to a heterogeneous network that can provide a high data transfer rate in all cell areas by installing a plurality of small cells (e.g., micro cells, pico cells, femto cells, etc.) having low transmit power in the existing macro cell area. However, in cell miniaturization and a heterogeneous network, since a plurality of adjacent cells cause severe inter-cell interference with each other, an interference control technique capable of efficiently controlling inter-cell interference may play a very important role in improving system performance.

The maximum multiplexing gain or Degrees of Freedom (DoF) in a network, which can be obtained from an interference channel, and in which a plurality of transmitters and receivers exist, may be obtained using an Interference Alignment (IA) technique, and based thereon, many studies have been made on IA, as an efficient interference control scheme in the interference-limited environment where multiple users exist.

IA is a transmission/reception technique that can obtain the maximum DoF by aligning all interference signals within the allowable dimension by expanding the signal space from the multi-user interference channel to the time, frequency and spatial dimension. IA can secure the signal space by expanding the time, the frequency, and/or the number of antennas, whereas most studies which have been conducted up to now have secured the interference signal space by expanding only the number of antennas, which causes a significant increase in the number of required antennas in the network environment where more data stream DoF or spatial multiplexing gain is desired. The method of securing the signal space of IA by using the time or frequency resources may be low in the total transfer rate performance compared with the method of using only the antennas. Recently, therefore, an IA technique that uses the multi-antenna and multi-frequency resources at the same time has been studied.

Since the conventional IA technique that uses the multi-antenna and multi-frequency resources at the same time has considered only the performance in terms of the DoF, the IA technique may be low in performance in a low Signal to Noise Ratio (SNR) region instead, compared with the existing Time Division Multiple Access (TDMA) based Orthogonal Frequency Division Multiplexing (OFDM) scheme in terms of the total transfer rate of the network. Therefore, there is a need for a method capable of selecting and utilizing more frequency resources for IA.

SUMMARY

The present invention has been made to address at least the above-mentioned problems and/or disadvantages and to provide at least the advantages described below. Accordingly, an aspect of the present invention is to provide a transmission apparatus and frequency assignment method capable of increasing the total transfer rate in an interference alignment-based interference channel environment that uses the multi-antenna and multi-frequency resources at the same time.

Another aspect of the present invention is to provide a method for more efficiently assigning frequencies to be used during interference alignment in a network environment in which the total number of frequency assignments for interference alignment is assumed to be sufficient.

In accordance with an aspect of the present invention, there is provided a frequency assignment method in a communication system. The method includes transmitting, by a base station, a pilot signal to the plurality of terminals; receiving, by the base station, channel information and a Signal to Interference Ratio (SIR) from the plurality of terminals as feedback information; determining, by the base station, a number of subcarriers to be used for interference alignment and a terminal to which interference alignment is to be applied, using the feedback information; selecting, by the base station, a frequency set to be used for interference alignment among preset frequency sets for interference alignment, and generating a transmit precoding matrix using a maximum of Degrees of Freedom (DoF) that can be obtained for each frequency; and transmitting, by the base station, an index of the selected frequency set to the determined terminal using the generated transmit precoding matrix.

In accordance with another aspect of the present invention, there is provided a frequency assignment method in a communication system. The method includes receiving, by a terminal, a pilot signal from a base station; estimating, by the terminal, a channel using the received pilot signal and calculating a Signal to Interference Ratio (SIR); transmitting, by the terminal, information concerning the estimated channel and the calculated SIR to the base station as feedback information; receiving, by the terminal, an index of a frequency set for interference alignment, which is determined based on the feedback information, from the base station; and performing, by the terminal, interference alignment decoding on a subcarrier corresponding to the received index.

In accordance with another aspect of the present invention, there is provided a frequency assignment apparatus in a communication system. The apparatus includes a transceiver configured to transmit a pilot signal to the plurality of terminals and receive channel information and Signal to Interference Ratio (SIR) from the plurality of terminals as feedback information; an interference alignment processor configured to determine a number of subcarriers to be used for interference alignment and a terminal to which interference alignment is to be applied, using the feedback information, select a frequency set to be used for interference alignment among preset frequency sets for interference alignment, and generate a transmit precoding matrix using a maximum of Degrees of Freedom (DoF) that can be obtained for each frequency; and a controller configured to control the transceiver and the interference alignment processor, wherein the transceiver transmits an index of the selected frequency set to the determined terminal using the generated transmit precoding matrix.

In accordance with another aspect of the present invention, there is provided an interference alignment-based frequency assignment apparatus in a communication system including a plurality of base stations and a plurality of terminals, each of the base stations and terminals having a plurality of antennas. The apparatus includes a transceiver configured to receive a pilot signal from a base station, transmit feedback information to the base station, and receive an index of a frequency set for interference alignment, which is determined based on the feedback information, from the base station; an interference alignment processor configured to estimate a channel using the received pilot signal, calculate a Signal to Interference Ratio (SIR), and perform interference alignment decoding on a subcarrier corresponding to the received index; and a controller configured to control the transceiver and the interference alignment processor.

BRIEF DESCRIPTION OF THE DRAWINGS

The above and other aspects, features and advantages of the present invention will be more apparent from the following description, taken in conjunction with the accompanying drawings, in which.

DETAILED DESCRIPTION OF EMBODIMENTS OF THE PRESENT INVENTION

Figure 1:
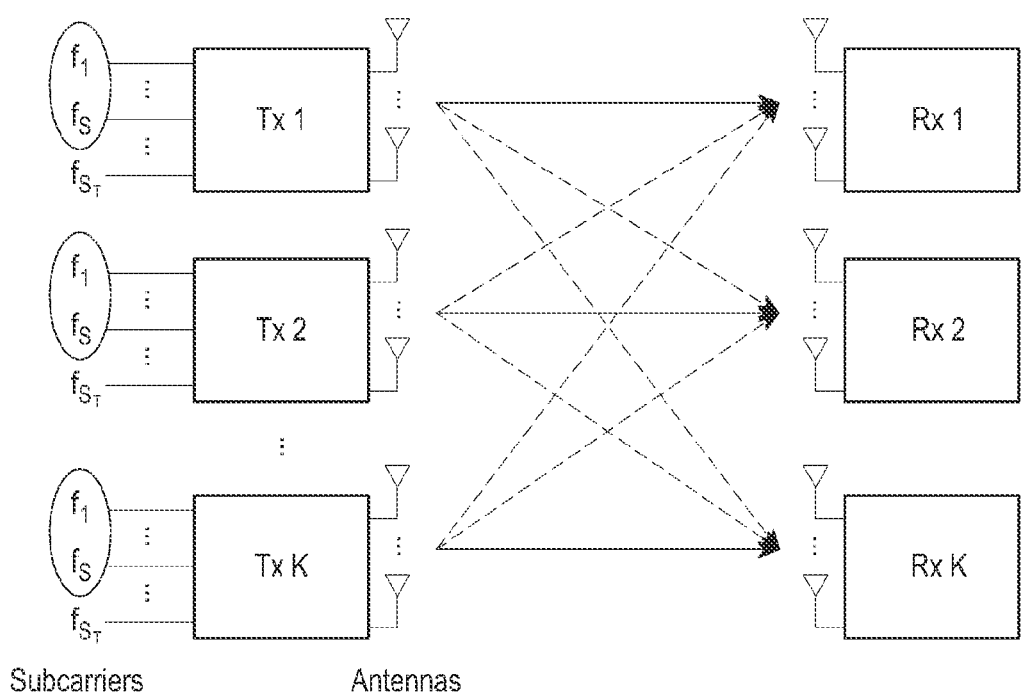
FIG. 1 illustrates an interference channel system that utilizes multiple antennas and multiple frequencies at the same time, according to an embodiment of the present invention.

The following description with reference to the accompanying drawings is provided to assist in a comprehensive understanding of embodiments of the present invention as defined by the claims and their equivalents. It includes various specific details to assist in that understanding but these are to be regarded as mere examples. Accordingly, those of ordinary skilled in the art will recognize that various changes and modifications of the embodiments of the present invention described herein can be made without departing from the scope and spirit of the present invention. In addition, descriptions of well-known functions and constructions are omitted for clarity and conciseness.

Throughout the drawings, like reference numerals will be understood to refer to like parts, components, and structures.

The terms and words used in the following description and claims are not limited to their dictionary meanings, but, are merely used to enable a clear and consistent understanding of the present invention. Accordingly, it should be apparent to those skilled in the art that the following description of embodiments of the present invention is provided for illustration purpose only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An embodiment of the present invention provides a transmission apparatus and frequency assignment method that can be applied to the general situation in which the number of transmitter/receiver pairs, the entire frequency for interference alignment, and the number of actually used frequencies are not limited in an interference channel to which interference assignment that utilizes multiple antennas and multiple frequencies at the same time is applied. To this end, a transmit filter will be described first, a subcarrier selection method will be described, and operations of a base station and a terminal, to which IA according to an embodiment of the present invention is applied, will be described.

FIG. 1 illustrates an interference channel system that utilizes multiple antennas and multiple frequencies at the same time, according to an embodiment of the present invention.

It is assumed in FIG. 1 that K transmitters and receivers have M and N antennas, respectively; all of $S_T$ frequencies are assigned to each user for interference alignment; and the number of frequencies actually used for interference alignment is S. However, the present invention is not be limited thereto, and may be applied to the case where the transmitters and the receivers are different in number.

First, a description is provided of how to generate a transmit precoding matrix in each transmitter.

In the existing IA that uses multiple antennas and multiple frequencies at the same time, the maximum Degrees of Freedom (DoF) d that can be obtained per transmitter/receiver pair and per frequency is obtained in the form of Equation (1) below.

$$d \le \min\left(\frac{(K-1)N}{K(K-1)-1}, M\right) \quad (1)$$

If a transmit precoding matrix in an i-th transmitter, which is obtained by the existing IA, is represented by $\tilde{V}_i$, a thin QR decomposition scheme may be applied to increase the total transfer rate in an embodiment of the present invention, and the scheme is as shown in Equation (2).

$$\tilde{V}_i = QR \quad (2)$$

where $\tilde{V}_i$ means the existing transmit precoding apparatus with a matrix size of MS*NS, Q denotes a semiunitary matrix with a size of MS*Sd, and R denotes a matrix with a size of Sd*Sd. The transmit precoding apparatus $V_i$ in each transmitter according to an embodiment of the present invention is configured as shown in Equation (3) below, to make a transmit vector sending each data stream more orthogonal.

$$V_i = Q \quad (3)$$

Next, a description is provided of a frequency assignment algorithm to be actually used for interference alignment in the network.

The entire frequency set assigned for interference alignment in the network is expressed as shown in Equation (4) below.

$$C_T = \{f_1, f_2, \ldots, f_S, \ldots, f_{S+P}, \ldots, f_{S_T}\} \quad (4)$$

Herein, the number of frequencies available for interference alignment in the network is $n(C_T) = S_T$.

Next, two sets of $C_1$ and $C_2$ are set as frequency sets (e.g., subsets of the entire frequency set) to be actually used in the network. The two sets satisfy the conditions as shown in Equation (5) below.

$$n(C_1) = n(C_2) = S,$$

$$n(C_2 - C_1) = P \quad (5)$$

Herein, $C_2$ is a set obtained by changing only P frequencies among the frequencies used in $C_1$, and an example thereof is as shown in Equation (6) below. Although it is assumed in Equation (6) that each of $C_1$ and $C_2$ is a set of consecutive frequencies, the frequencies should not necessarily be consecutive.

$$C_1 = \{f_1, f_2, \ldots, f_S\}$$

$$C_2 = \{f_{P+1}, f_{P+2}, \ldots, f_S, \ldots, f_{S+P}\} \quad (6)$$

The network calculates a rate of IA that first uses frequencies in $C_1$ among the two sets. If the rate that uses the frequencies used in $C_1$ exceeds a threshold determined by the system, the system determines to use the frequencies in $C_1$. However, if the rate that uses the frequencies in $C_1$ does not exceed the threshold, the system determines to use the frequencies in $C_2$. This determination may be made base on the feedback information that is received after the network receives feedback information including channel information and Signal to Interference Ratio (SIR) from a terminal.

Figure 2A:
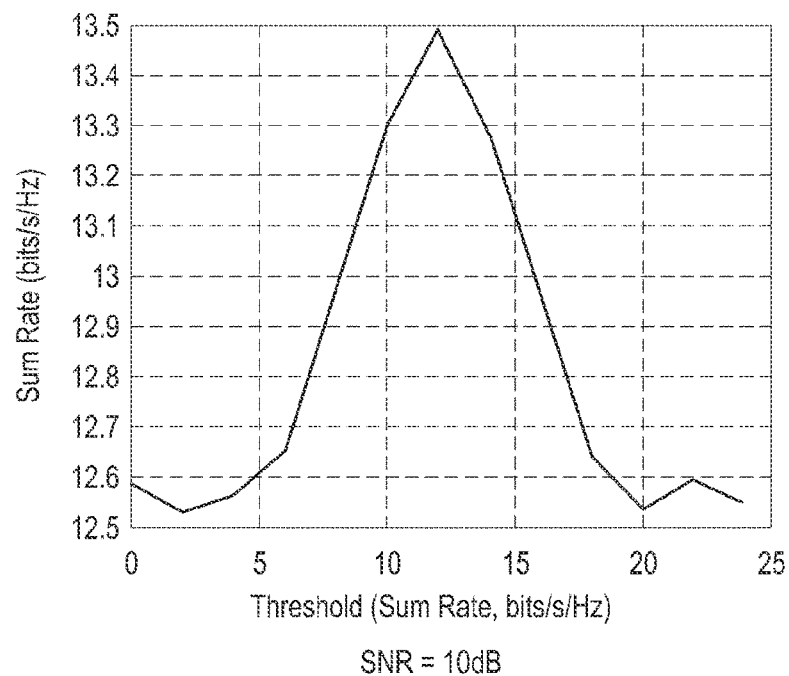
FIGS. 2A and 2B are graphs for determining a threshold of the total rate to be used in a system in which interference alignment is to be applied, according to an embodiment of the present invention.
Figure 2B:
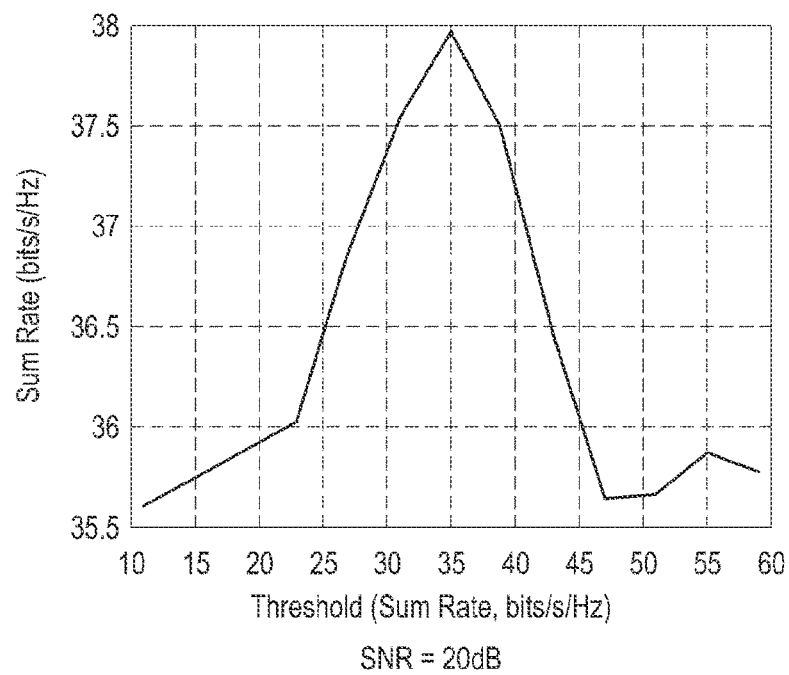

FIGS. 2A and 2B are graphs for determining a threshold of the total rate to be used in a system to which interference alignment is to be applied, according to an embodiment of the present invention.

FIGS. 2A and 2B illustrate the results obtained by determining a threshold at which the total rate is maximum, while changing a threshold for a case where S=5, $S_T$=6, and a Signal to Noise Ratio (SNR) is 10 dB and 20 dB, respectively. The optimal threshold obtained as a result of FIGS. 2A and 2B may be the same as an average total rate in a case where only the fixed frequency is used. Therefore, the system calculates in advance an average total rate at a fixed frequency and uses it as an optimal threshold.

Figure 3:
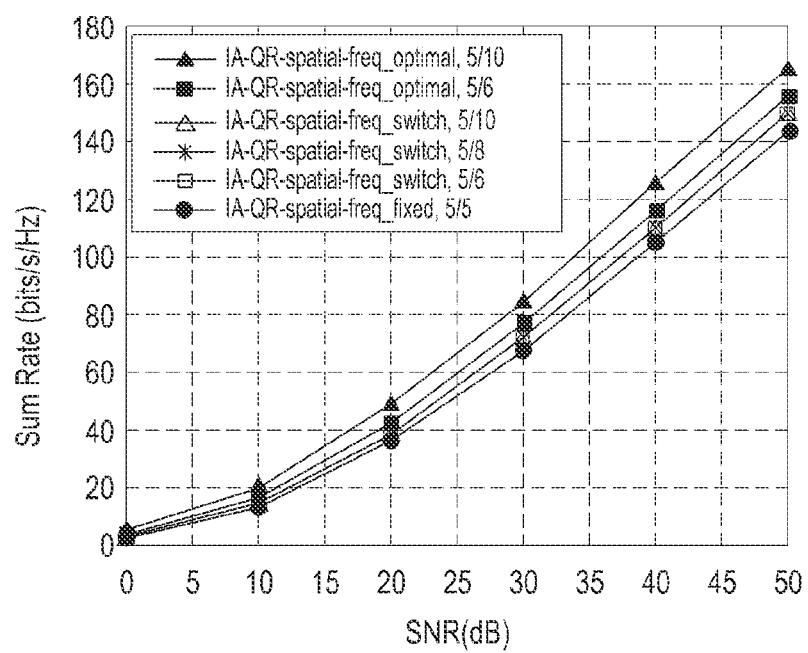
FIG. 3 is a graph illustrating experimental results for finding the minimum frequency switching count P required to obtain the optimal performance when a frequency assignment algorithm according to an embodiment of the present invention is used.

FIG. 3 is a graph illustrating the experimental results for finding the minimum frequency switching count P required to obtain the optimal performance when a frequency assignment algorithm according to an embodiment of the present invention is used.

In FIG. 3, the frequency assignment scheme (hereinafter, referred to as a "proposed frequency assignment scheme") according to an embodiment of the present invention is called "IA-QR-spatial-freq_switch", the method of using a fixed frequency is called "IA-QR-spatial-freq_fixed", and the scheme (hereinafter, referred to as an "optimal frequency selection scheme") that is considered for a case where all frequencies are selected to select the optimal frequency is called "IA-QR-spatial-freq_optimal". The number of actually used frequencies and additionally required frequencies are expressed in the form of "S/S+P".

It can be noted from FIG. 3 that the frequency assignment of the present invention scheme has a very low complexity compared with the optimal frequency selection scheme, and has a performance improvement compared with the method of using a fixed frequency. It can be appreciated that the same performance is guaranteed regardless of the number P of switching frequencies. In other words, the frequency assignment scheme shows the same performance results as those of 5/6 and 5/8, even though only one frequency is switched (e.g. 5/6 in FIG. 3) without switching all of 5 frequencies. This is because the interference alignment technique that utilizes multiple antennas and multiple frequencies at the same time is not affected by the channel characteristics. In conclusion, the frequency assignment scheme additionally requires only one frequency resource in addition to the actually used frequency, and improves performance without additional calculations, compared with the fixed frequency scheme.

To apply the frequency assignment algorithm according to an embodiment of the present invention to a cellular system, separately operating the frequency domain for IA is considered. In other words, a plurality of frequency set groups for IA, which are to be actually used, may exist in the cellular system, and a base station determines a frequency set group to be used for IA, using the feedback information sent from a terminal. In this case, a threshold to be used in determining a frequency set group is set in advance in the entire system. If a base station determines a frequency (i.e., subcarrier) for IA, which is to be used in the system, then the base station transmits only an index of the subcarrier for IA to each terminal over a channel such as a Physical Downlink Control Channel (PDCCH). Then, the terminal generates a reception interference cancellation matrix using the signal that is transmitted over the subcarrier.

Figure 4:
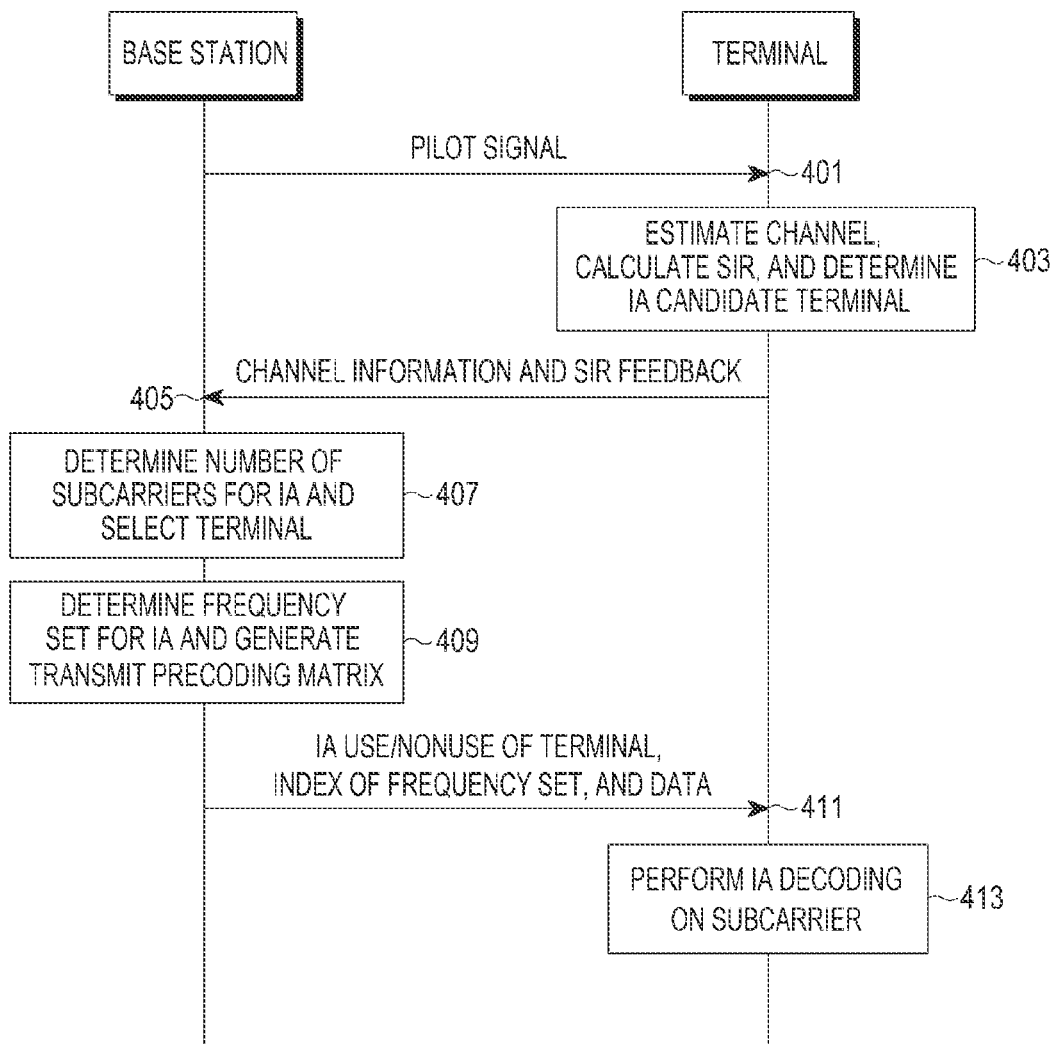
FIG. 4 is a flow diagram illustrating signal transmission/reception between a base station and a terminal when a frequency assignment scheme according to an embodiment of the present invention is applied in a cellular system environment.

FIG. 4 is a flow diagram illustrating signal transmission/reception between a base station and a terminal when a frequency assignment scheme according to an embodiment of the present invention is applied in a cellular system environment.

Referring to FIG. 4, if a base station transmits a pilot signal to a terminal in step 401, the terminal estimates a channel and calculates a Signal to Interference Ratio (SIR) based on the received pilot signal, and determines whether the terminal itself is an IA candidate terminal, based on the calculated SIR value in step 403. Assuming that a proper SIR determination value that is determined as an IA candidate terminal is determined in advance in the system, a SIR determination value may vary depending on several conditions such as the total number of terminals in the system, the channel conditions and the like. In step 405, the terminal transmits the estimated channel value and the calculated SIR value to the base station. The base station may share the feedback information received from the terminal with other base stations. In step 407, the base station determines the number of subcarriers for IA based on the feedback information received from the terminal, and selects a terminal to which the base station will transmit data, by performing a scheduling algorithm. In step 409, the base station determines a frequency set that is to be actually used for IA, using a predetermined threshold, and generates a transmit precoding matrix based on Equation (3) above. In step 411, the base station transmits, to the terminal, IA use/nonuse of a terminal to which the base station will transmit data, an index of a frequency set for IA, and the data. In step 413, the terminal performs IA decoding on the subcarrier using the index received from the base station, to generate a reception interference cancellation matrix.

Figure 5:
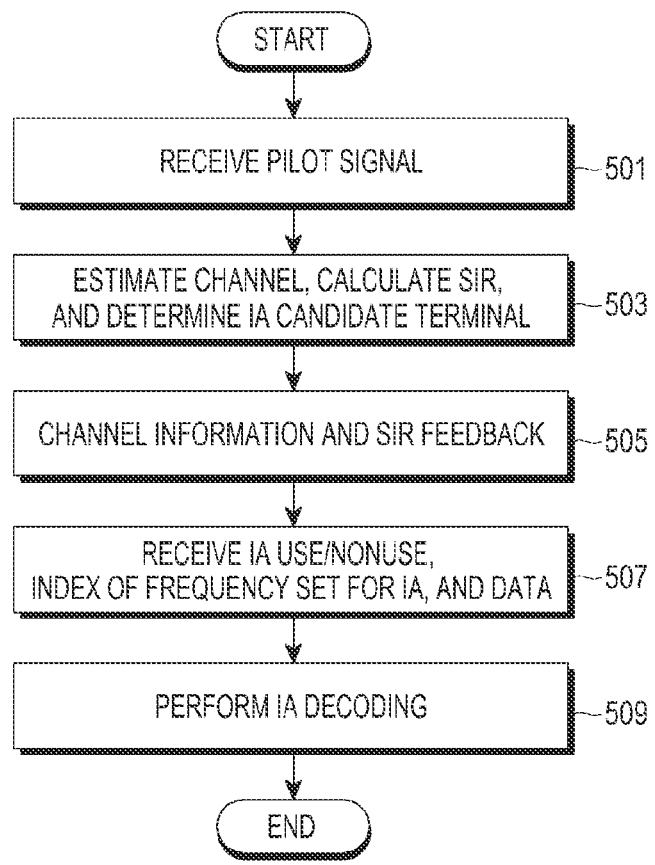
FIG. 5 is a flowchart illustrating an operation of a terminal when a frequency assignment scheme according to an embodiment of the present invention is applied.

FIG. 5 is a flowchart illustrating an operation of a terminal when a frequency assignment scheme according to an embodiment of the present invention is applied.

Referring to FIG. 5, a terminal receives a pilot signal from a base station in step 501. In step 503, the terminal estimates a channel, calculates an SIR based on the pilot signal, and determines whether the terminal itself is an IA candidate terminal. In step 505, the terminal transmits, or feeds back, the estimated channel value and the calculated SIR value to the base station. Upon receiving IA use/nonuse, an index of a frequency set for IA, and data from the base station in step 507, the terminal performs IA decoding using a signal transmitted in a subcarrier corresponding to the received index, in step 509.

Figure 6:
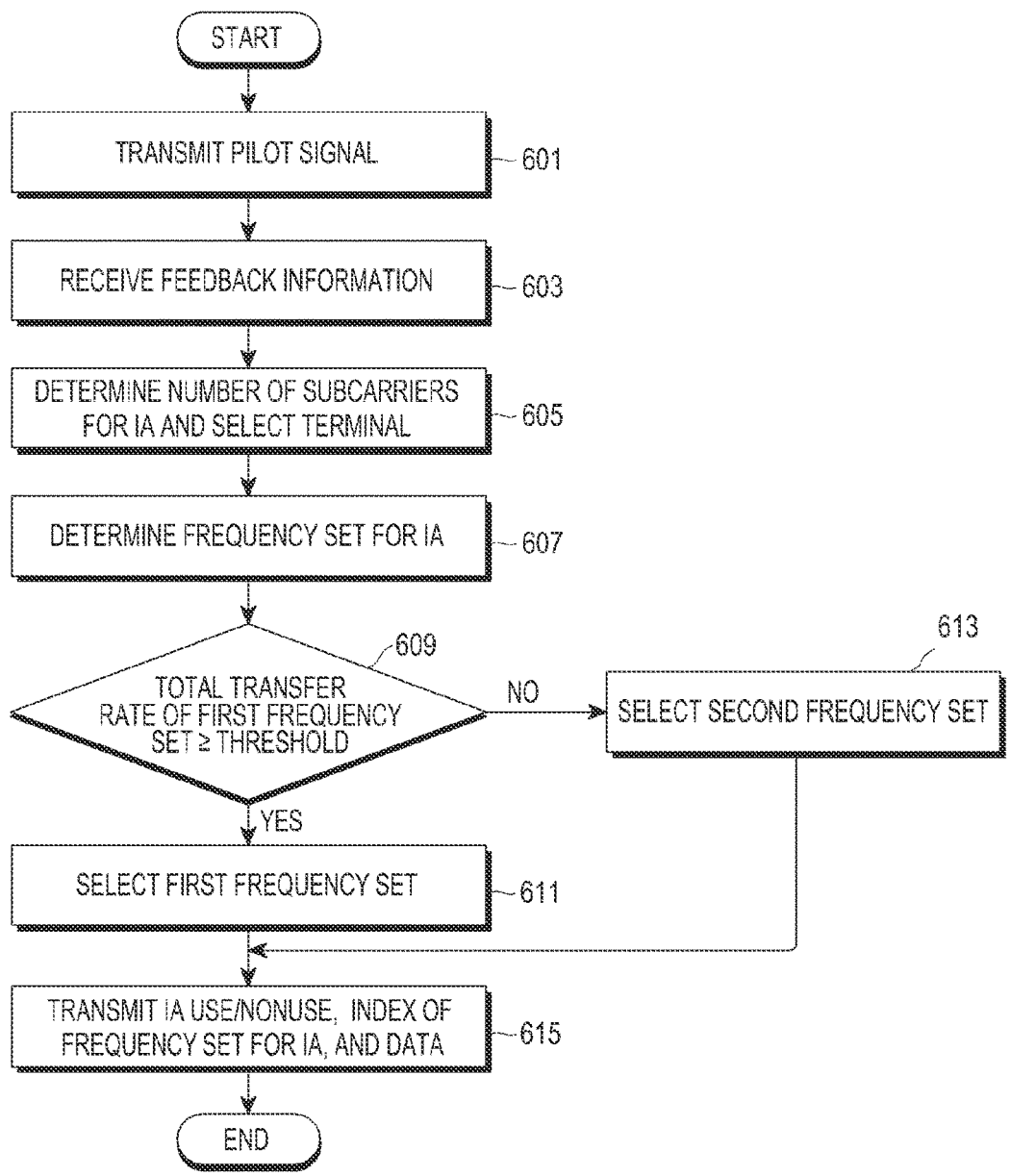
FIG. 6 is a flowchart illustrating an operation of a base station when a frequency assignment scheme according to an embodiment of the present invention is applied.

FIG. 6 is a flowchart illustrating an operation of a base station when a frequency assignment scheme according to an embodiment of the present invention is applied.

Referring to FIG. 6, a base station transmits a pilot signal to a terminal in step 601, and receives feedback information from the terminal in step 603. In step 605, the base station determines the number of subcarriers for IA based on the received feedback information and selects a terminal to which the base station will transmit data. Next, the base station determines a frequency set for IA in step 607, and determines a frequency set to be used for IA, using a predetermined threshold. In other words, the base station determines in step 609 whether the total rate of a first frequency set among two frequency sets is greater than or equal to a threshold, and if the total rate is greater than or equal to the threshold, the base station selects the first frequency set as a frequency set to be used for IA in step 611. If the total rate is less than the threshold, the base station selects the second frequency set as a frequency set to be used for IA in step 613. In step 615, the base station transmits, to the terminal, IA use/nonuse, an index of the selected frequency set for IA, and data.

Figure 7:
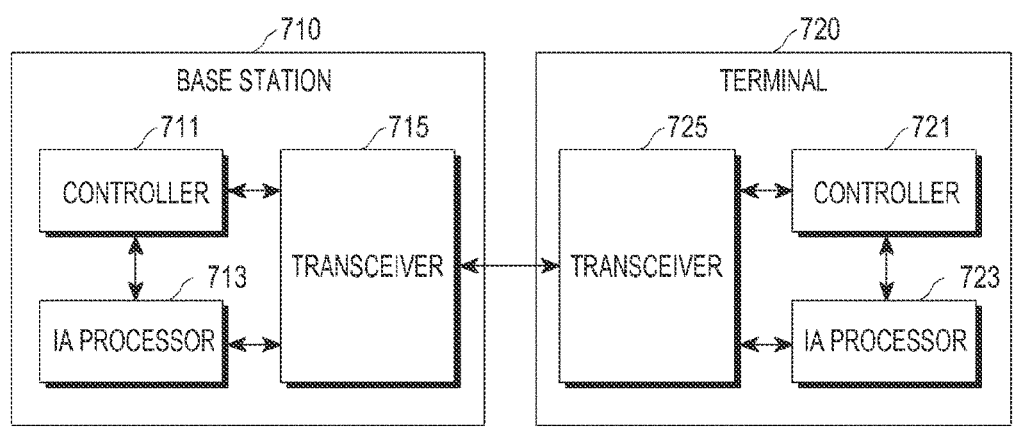
FIG. 7 illustrates a base station and a terminal for applying a frequency assignment scheme according to an embodiment of the present invention.

FIG. 7 illustrates a base station 710 and a terminal 720 for applying a frequency assignment scheme according to an embodiment of the present invention.

Referring to FIG. 7, the base station 710 includes a transceiver 715, a controller 711 and an IA processor 713, and the terminal 720 includes a transceiver 725, a controller 721 and an IA processor 723. The transceiver 715 in the base station 710 serves to exchange data and signals with the terminal 720, and the IA processor 713 in the base station 710 performs steps 605 to 611 in the flowchart of FIG. 6. The controller 711 in the base station 710 controls operations of the transceiver 715 and the IA processor 713. Similarly, the transceiver 725 in the terminal 720 serves to exchange data and signals with the base station 710, and the IA processor 723 in the terminal 720 performs steps 503 and 509 in the flowchart of FIG. 5. The controller 721 in the terminal 720 controls operations of the transceiver 725 and the IA processor 723.

As is apparent from the foregoing description, by applying the transmit precoding matrix technique according to an embodiment of the present invention to the interference channel environment, it is possible to solve the performance degradation issues in a low SNR region, which may occur in the interference alignment technique. In addition, by applying the frequency assignment algorithm according to an embodiment of the present invention to the interference channel environment, it is possible to obtain the optimal performance with low complexity.

While the present invention has been shown and described with reference to certain embodiments thereof, it will be understood by those skilled in the art that various changes in form and details may be made therein without departing from the scope and spirit of the present invention as defined by the appended claims and their equivalents.

What is claimed is:

1. A frequency assignment method in a communication system, the method comprising:
    transmitting, by a base station, a pilot signal to a plurality of terminals;
    receiving, by the base station, channel information and a signal to interference ratio (SIR) from the plurality of terminals as feedback information;
    determining, by the base station, a number of subcarriers to be used for interference alignment and a terminal to which interference alignment is to be applied, using the feedback information;
    selecting, by the base station, a frequency set to be used for interference alignment among preset frequency sets for interference alignment, and generating a transmit precoding matrix using a maximum of degrees of freedom (DoF) that can be obtained for each frequency in the frequency set; and
    transmitting, by the base station, an index of the selected frequency set to the determined terminal using the generated transmit precoding matrix,
    wherein the transmit precoding matrix is determined as $$V=Q$$

where V denotes the transmit precoding matrix, Q denotes a semiunitary matrix with a size of MS*Sd, M denotes a number of a plurality of antennas of the base station, S denotes the number of subcarriers used for interference alignment, and "d" denotes a maximum of DoF that can be obtained for each frequency.

2. The frequency assignment method of claim 1, wherein selecting, by the base station, the frequency set comprises:
    calculating a total transfer rate of a first frequency set among the preset frequency sets;
    selecting the first frequency set if the total transfer rate of the first frequency set is greater than or equal to an average total transfer rate; and
    selecting a second frequency set among the preset frequency sets if the total transfer rate of the first frequency set is less than the average total transfer rate, and
    wherein the preset frequency sets for interference alignment include the first frequency set and the second frequency set, each of which has a same number of frequencies, and the second frequency set includes P frequencies having different values from those of frequencies included in the first frequency set, and wherein the P is a number.

3. The frequency assignment method of claim 2, wherein the first frequency set and the second frequency set are identical in all frequencies except for one frequency.

4. The frequency assignment method of claim 2, wherein the average total transfer rate is an average total transfer rate where a fixed frequency is used for interference alignment.

5. A frequency assignment method in a communication system, the method comprising:
  receiving, by a terminal, a pilot signal from a base station;
  estimating, by the terminal, a channel using the received pilot signal and calculating a signal to interference ratio (SIR);
  transmitting, by the terminal, information concerning the estimated channel and the calculated SIR to the base station as feedback information;
  receiving, by the terminal, an index of a frequency set for interference alignment, which is determined based on the feedback information, from the base station; and
  performing, by the terminal, interference alignment decoding on a subcarrier corresponding to the received index,
  wherein the index of the frequency set for interference alignment is received using a transmit precoding matrix that is generated using a maximum of degrees of freedom (DoF) that can be obtained for each frequency in the frequency set, and
  wherein the transmit precoding matrix is determined by $$V=Q$$

where V denotes the transmit precoding matrix, Q denotes a semiunitary matrix with a size of MS*Sd, M denotes a number of a plurality of antennas of the base station, S denotes the number of subcarriers used for interference alignment, and "d" denotes a maximum of degrees of freedom (DoF) that can be obtained for each frequency.

6. The frequency assignment method of claim 5, wherein the frequency set for interference alignment is selected from among preset frequency sets for interference alignment,
  wherein if a total transfer rate of a first frequency set is greater than or equal to an average total transfer rate, the first frequency set among the preset frequency set is selected as the frequency set for interference alignment, and if a total transfer rate of the first frequency set is less than the average total transfer rate, a second frequency set is selected as the frequency set for interference alignment, and
  wherein the preset frequency sets for interference alignment include the first frequency set and the second frequency set, each of which has an identical number of frequencies, and the second frequency set includes P frequencies having different values than those of frequencies in the first frequency set, and wherein the P is a number.

7. The frequency assignment method of claim 6, wherein the first frequency set and the second frequency set are identical in all frequencies except for one frequency.

8. The frequency assignment method of claim 5, wherein the average total transfer rate is an average total transfer rate where a fixed frequency is used for interference alignment.

9. A frequency assignment apparatus in a communication system, the apparatus comprising:
  a transceiver configured to transmit a pilot signal to the plurality of terminals and receive channel information and a signal to interference ratio (SIR) from the plurality of terminals as feedback information; and
  a processor configured to:
    determine a number of subcarriers to be used for interference alignment and a terminal to which interference alignment is to be applied, using the feedback information,
    select a frequency set to be used for interference alignment among preset frequency sets for interference alignment,
    generate a transmit precoding matrix using a maximum of degrees of freedom (DoF) that can be obtained for each frequency in the frequency set,
    control the transceiver to transmit an index of the selected frequency set to the determined terminal using the generated transmit precoding matrix,
  wherein the transmit precoding matrix is determined by $$V=Q$$

where V denotes the transmit precoding matrix, Q denotes a semiunitary matrix with a size of MS*Sd, M denotes a number of a plurality of antennas of the base station, S denotes the number of subcarriers used for interference alignment, and "d" denotes a maximum of DoF that can be obtained for each frequency.

10. The frequency assignment apparatus of claim 9, wherein the processor further configured to:
  calculate a total transfer rate of a first frequency set;
  select the first frequency set among the preset frequency set, if the total transfer rate of the first frequency set is greater than or equal to an average total transfer rate; and
  select a second frequency set among the preset frequency set, if the total transfer rate of the first frequency set is less than the average total transfer rate, and
  wherein the preset frequency sets for interference alignment include the first frequency set and the second frequency set, each of which has an identical number of frequencies, and the second frequency set includes P frequencies having different values than those of frequencies included in the first frequency set, and wherein the P is a number.

11. The frequency assignment apparatus of claim 10, wherein the first frequency set and the second frequency set are identical in all frequencies except for one frequency.

12. The frequency assignment apparatus of claim 10, wherein the average total transfer rate is an average total transfer rate where a fixed frequency is used for interference alignment.

13. A frequency assignment apparatus in a communication system, the apparatus comprising:
  a transceiver configured to receive a pilot signal from a base station; and
  a processor configured to:
    estimate a channel using the received pilot signal, calculate a signal to interference ratio (SIR),
    control the transceiver to transmit feedback information to the base station,
    control the transceiver to receive an index of a frequency set for interference alignment, which is determined based on the feedback information, from the base station, and
    perform interference alignment decoding on a subcarrier corresponding to the received index,
  wherein the index of the frequency set for interference alignment is received using a transmit precoding matrix that is generated using a maximum of degrees of freedom (DoF) that can be obtained for each frequency in the frequency set, and
  wherein the transmit precoding matrix is determined by $$V = Q$$

where V denotes the transmit precoding matrix, Q denotes a semiunitary matrix with a size of MS*Sd, M denotes a number of a plurality of antennas of the base station, S denotes the number of subcarriers used for interference alignment, and "d" denotes a maximum of degrees of freedom (DoF) that can be obtained for each frequency.

14. The frequency assignment apparatus of claim 13, wherein the frequency set for interference alignment is selected from among preset frequency sets for interference alignment, wherein if a total transfer rate of a first frequency set is greater than or equal to an average total transfer rate, the first frequency set among the preset frequency set is selected as the frequency set for interference alignment, and if a total transfer rate of the first frequency set is less than the average total transfer rate, a second frequency set among the preset frequency set is selected as the frequency set for interference alignment, and wherein the preset frequency sets for interference alignment include the first frequency set and the second frequency set, each of which has an identical number of frequencies, and the second frequency set includes P frequencies having different values than those of frequencies included in the first frequency set, and wherein the P is a number.

15. The frequency assignment apparatus of claim 14, wherein the first frequency set and the second frequency set are identical in all frequencies except for one frequency.

16. The frequency assignment apparatus of claim 13, wherein the average total transfer rate is an average total transfer rate where a fixed frequency is used for interference alignment.

* * * * *